US008657552B1

(12) United States Patent
Raney

(10) Patent No.: US 8,657,552 B1
(45) Date of Patent: Feb. 25, 2014

(54) HAND TRUCK RAMP SYSTEM

(76) Inventor: Keith Raney, St. Petersburg, FL (US)

(*) Notice: Subject to any disclaimer, the term of this patent is extended or adjusted under 35 U.S.C. 154(b) by 0 days.

(21) Appl. No.: 12/798,844

(22) Filed: Apr. 13, 2010

Related U.S. Application Data

(63) Continuation-in-part of application No. 12/651,263, filed on Dec. 31, 2009, now abandoned.

(60) Provisional application No. 61/142,209, filed on Jan. 1, 2009.

(51) Int. Cl.
*B60P 9/00* (2006.01)

(52) U.S. Cl.
USPC ............ 414/462; 224/501; 224/512; 224/536

(58) Field of Classification Search
USPC ............................. 224/501, 536, 512; 414/462
See application file for complete search history.

(56) References Cited

U.S. PATENT DOCUMENTS

| | | | | |
|---|---|---|---|---|
| 5,522,530 A | * | 6/1996 | Boettcher | 224/488 |
| 6,786,373 B2 | * | 9/2004 | Pierce et al. | 224/501 |
| 6,948,645 B2 | * | 9/2005 | Pierce et al. | 224/501 |
| 7,163,213 B2 | | 1/2007 | Chambers | |

* cited by examiner

Primary Examiner — Scott Lowe

(57) ABSTRACT

A support rack has spaced vertical rails and horizontal upper, lower and intermediate rails. The horizontal rails are coupled to the vertical rails. A pivotable locking bar is between the horizontal rails. Side plates with rearward ends are attached to the vertical rails adjacent to the lower rail. The side plates have forward ends forwardly of the vertical rails. A rectangular ramp/platform has a forward edge extending forwardly of the vertical rails and a rearward edge extending rearwardly of the vertical rails and having parallel side edges. Hinges pivotally couple the ramp/platform adjacent to its forward edge to the side plates adjacent to their forward edges for movement between raised and lowered orientations. A cross support bar has ends attached to the ramp/platform adjacent to the side edges parallel with and rearwardly of the horizontal lower rail. The cross support bar is spaced above the ramp/platform.

5 Claims, 3 Drawing Sheets

US 8,657,552 B1

HAND TRUCK RAMP SYSTEM

RELATED APPLICATION

The present non-provisional patent application is a continuation-in-part of abandoned non-provisional patent application Ser. No. 12/651,263 filed Dec. 31, 2009, which claims the benefit of Provisional Application 61/142,209 filed Jan. 1, 2009, the subject matter of which applications is incorporated herein by reference.

BACKGROUND OF THE INVENTION

1. Field of the Invention

The present invention relates to a hand truck ramp system and more particularly pertains to facilitating the storage, and the removal from storage, of a hand truck with respect to a support rack mounted to the rear of a vehicle, the facilitating being done in a safe, convenient and economical manner.

2. Description of the Prior Art

The use of ramp systems of known designs and configurations is known in the prior art. More specifically, ramp systems of known designs and configurations previously devised and utilized for the purpose of facilitating the use of a hand truck through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,163,213 issued Jan. 16, 2007 to Chambers relates to a Powered Hand Truck.

While this device fulfills its respective, particular objectives and requirements, the aforementioned patent does not describe a hand truck ramp system that allows for facilitating the storage, and the removal from storage, of a hand truck with respect to a support rack mounted to the rear of a vehicle, the facilitating being done in a safe, convenient and economical manner.

In this respect, the hand truck ramp system according to the present invention substantially departs from the conventional concepts and designs of the prior art, and in doing so provides an apparatus primarily developed for the purpose of facilitating the storage, and the removal from storage, of a hand truck with respect to a support rack mounted to the rear of a vehicle, the facilitating being done in a safe, convenient and economical manner.

Therefore, it can be appreciated that there exists a continuing need for a new and improved hand truck ramp system which can be used for facilitating the storage, and the removal from storage, of a hand truck with respect to a support rack mounted to the rear of a vehicle, the facilitating being done in a safe, convenient and economical manner. In this regard, the present invention substantially fulfills this need.

SUMMARY OF THE INVENTION

In view of the foregoing disadvantages inherent in the known types of ramp systems of known designs and configurations now present in the prior art, the present invention provides an improved hand truck ramp system. As such, the general purpose of the present invention, which will be described subsequently in greater detail, is to provide a new and improved hand truck ramp system and method which has all the advantages of the prior art and none of the disadvantages.

To attain this, the present invention essentially comprises a hand truck ramp system. First provided is a support rack. The support rack is adapted to be mounted to the rear of a vehicle (not shown). The support rack has a rearward face. The support rack has a forward face. The support rack has two laterally spaced vertical rails. The vertical rails have vertically aligned apertures. The support rack has a horizontal upper rail. The support rack has a horizontal lower rail. Both the upper and lower rails are fixedly coupled to the vertical rails. The support rack has a horizontal intermediate rail. The horizontal intermediate rail is adjustably coupled to the vertical rails through the apertures. The support rack has first and second horizontal rails. The first and second horizontal rails are adjustably coupled to the vertical rails through the apertures. The first and second horizontal rails extend rearwardly from the vertical rails. The first horizontal rail has pivot holes. The second horizontal rail has locking holes. The second horizontal rail has a pivotable locking bar. The locking bar has a pivot end. The pivot end has a pivot pin. The pivot pin is coupled to the pivot holes. The pivotable locking bar has a locking end. The locking end a lock pin. The pin is couplable with the locking holes. A pair of side plates is provided. The side plates have rearward ends. The rearward ends are attached to the vertical rails adjacent to the horizontal lower rail. The side plates have forward ends. The forward ends are provided forwardly of the vertical rails.

A rectangular ramp/platform is provided. The ramp/platform has a forward edge. The forward edge extends forwardly of the vertical rails. The ramp/platform has a rearward edge. The rearward edge extends rearwardly of the vertical rails. The ramp/platform has parallel side edges. The vertical rails are located closer to the forward edge than the rearward edge.

Hinges are provided. The hinges pivotally couple the ramp/platform adjacent to the forward edge of the ramp to the side plates adjacent to the forward end. In this manner the ramp/platform is movable between a horizontal raised orientation and an angled lowered orientation.

Provided next is a cross support bar. The cross support bar has ends. The ends are attached to the ramp/platform adjacent to the side edges parallel with and rearwardly of the horizontal lower rail. The cross support bar is spaced above the ramp/platform. The ramp/platform is adapted to receive and support a hand truck. The hand truck is of the type having a vertical frame above and a horizontal nose below. The hand truck also has wheels. The hand truck has an electrical drive. The nose of the hand truck is positionable above the ramp/platform and beneath the cross support bar. The ramp/platform is adapted to be rotated to the angled lowered orientation. In this manner the hand truck may be rolled onto and off of the ramp/platform. The ramp/platform is adapted to be rotated to the horizontal raised orientation with the nose of the hand truck beneath the cross support bar and the frame of the hand truck between the intermediate rail and the locking bar.

Further provided are spring pins. The spring pins extend upwardly from the ramp/platform rearwardly of the cross bar. The spring pins are adapted to contact and retain the hand truck on the ramp/platform when in the horizontal raised orientation.

Provided last is a mounting bar. The mounting bar has a central section. The central section has ends attached to the vertical rails. A charging connector is provided. The charging connector attached to the central section. The charging connector extends rearwardly. The charging connector is adapted to operatively contact and charge the electrical drive of the hand truck when on the ramp/platform in the horizontal raised orientation. The charging connector is further adapted to be separated from the electrical drive of the hand truck when in the angled lowered orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand truck ramp system which has all of the advantages of the prior art ramp systems of known designs and configurations and none of the disadvantages.

It is another object of the present invention to provide a new and improved hand truck ramp system which may be easily and efficiently manufactured and marketed.

It is further object of the present invention to provide a new and improved hand truck ramp system which is of durable and reliable constructions.

An even further object of the present invention is to provide a new and improved hand truck ramp system which is susceptible of a low cost of manufacture with regard to both materials and labor, and which accordingly is then susceptible of low prices of sale to the consuming public, thereby making such hand truck ramp system economically available to the buying public.

Even still another object of the present invention is to provide a hand truck ramp system for facilitating the storage, and the removal from storage, of a hand truck with respect to a support rack mounted to the rear of a vehicle, the facilitating being done in a safe, convenient and economical manner.

Lastly, it is an object of the present invention to provide a new and improved hand truck ramp system. A support rack has spaced vertical rails and horizontal upper, lower and intermediate rails. The horizontal rails are coupled to the vertical rails. A pivotable locking bar is provided between the horizontal rails. Side plates with rearward ends are attached to the vertical rails adjacent to the lower rail. The side plates have forward ends forwardly of the vertical rails. A rectangular ramp/platform has a forward edge extending forwardly of the vertical rails and a rearward edge extending rearwardly of the vertical rails and having parallel side edges. Hinges pivotally couple the ramp/platform adjacent to its forward edge to the side plates adjacent to their forward edges for movement between raised and lowered orientations. A cross support bar has ends attached to the ramp/platform adjacent to the side edges parallel with and rearwardly of the horizontal lower rail. The cross support bar is spaced above the ramp/platform.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
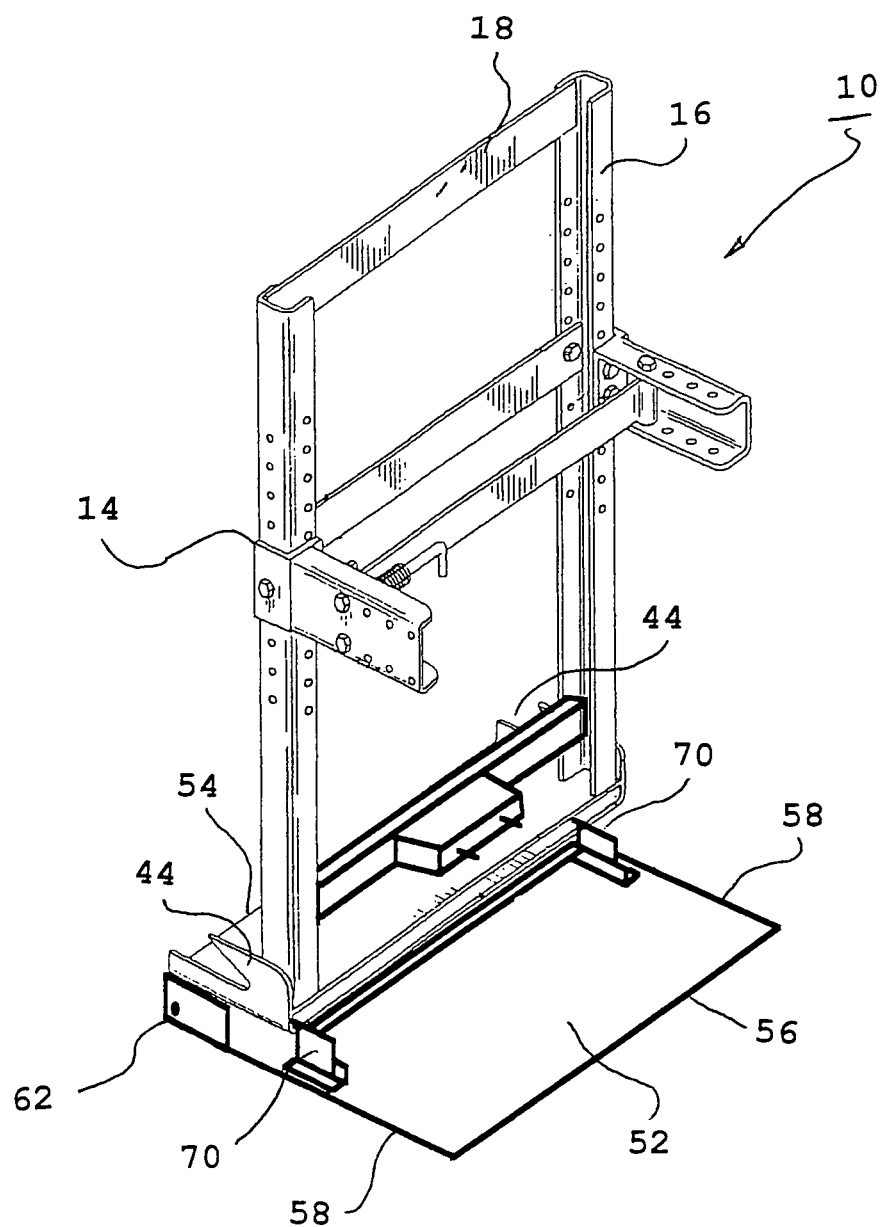
FIG. 1 is a perspective showing of a hand truck ramp system constructed in accordance with the principles of the present invention.
Figure 2:
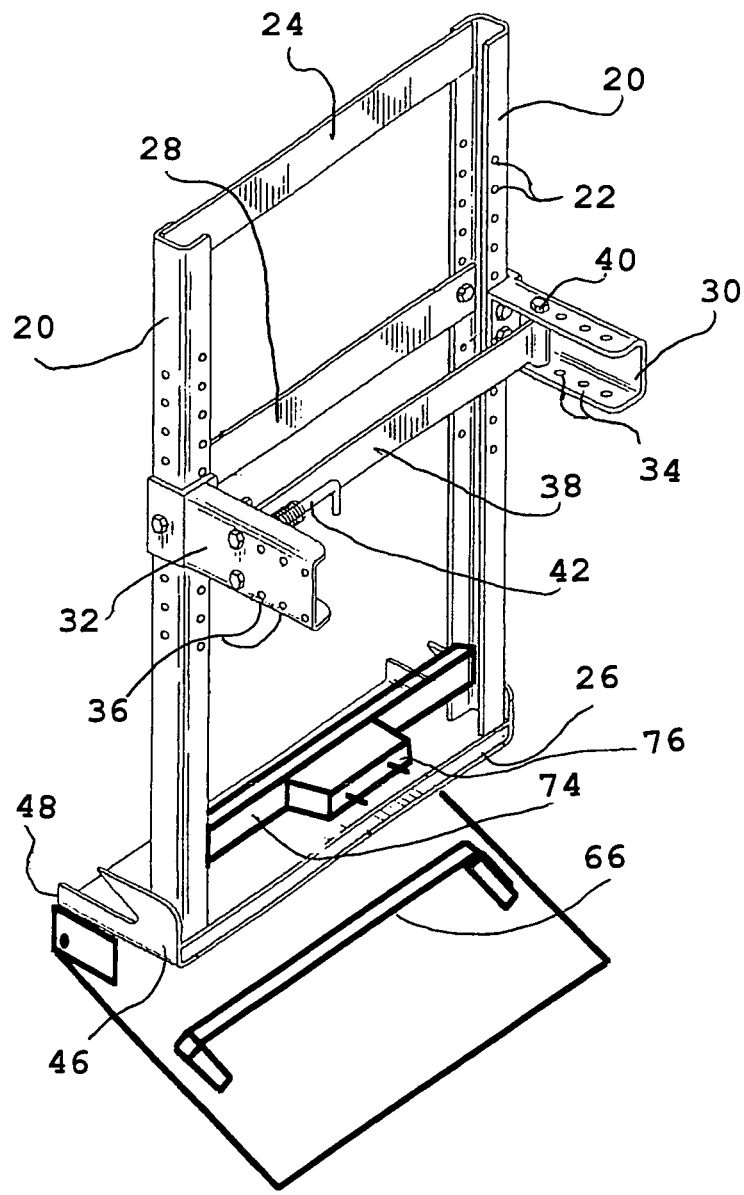
FIG. 2 is a perspective showing similar to FIG. 1 but with the ramp in the lowered orientation.
Figure 3:
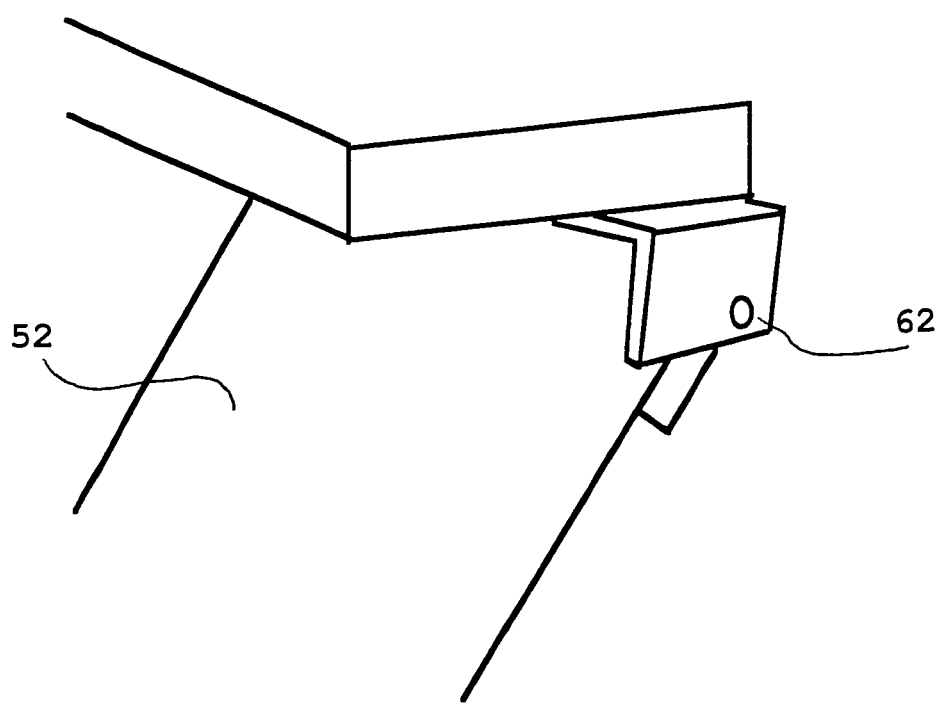
FIG. 3 is an enlarged showing of one of the hinges shown in the prior Figures.

With reference now to the drawings, and in particular to FIG. 1 thereof, the preferred embodiment of the new and improved hand truck ramp system embodying the principles and concepts of the present invention and generally designated by the reference numeral 10 will be described.

The present invention, the hand truck ramp system 10 is comprised of a plurality of components. Such components in their broadest context include xandx. Such components are individually configured and correlated with respect to each other so as to attain the desired objective.

First provided is a support rack 14. The support rack is adapted to be mounted to the rear of a vehicle (not shown). The support rack has a rearward face 16. The support rack has a forward face 18. The support rack has two laterally spaced vertical rails 20. The vertical rails have vertically aligned apertures 22. The support rack has a horizontal upper rail 24. The support rack has a horizontal lower rail 26. Both the upper and lower rails are fixedly coupled to the vertical rails. The support rack has a horizontal intermediate rail 28. The horizontal intermediate rail is adjustably coupled to the vertical rails through the apertures. The support rack has first and second horizontal rails 30, 32. The first and second horizontal rails are adjustably coupled to the vertical rails through the apertures. The first and second horizontal rails extend rearwardly from the vertical rails. The first horizontal rail has pivot holes 34. The second horizontal rail has locking holes 36. The second horizontal rail has a pivotable locking bar 38. The locking bar has a pivot end. The pivot end has a pivot pin 40. The pivot pin is coupled to the pivot holes. The pivotable locking bar has a locking end. The locking end a lock pin 42. The pin is couplable with the locking holes. A pair of side plates 44 is provided. The side plates have rearward ends 46. The rearward ends are attached to the vertical rails adjacent to the horizontal lower rail. The side plates have forward ends 48. The forward ends are provided forwardly of the vertical rails.

A rectangular ramp/platform 52 is provided. The ramp/platform has a forward edge 54. The forward edge extends forwardly of the vertical rails. The ramp/platform has a rearward edge 56. The rearward edge extends rearwardly of the vertical rails. The ramp/platform has parallel side edges 58. The vertical rails are located closer to the forward edge than the rearward edge.

Hinges 62 are provided. The hinges pivotally couple the ramp/platform adjacent to the forward edge of the ramp to the side plates adjacent to the forward end. In this manner the ramp/platform is movable between a horizontal raised orientation and an angled lowered orientation.

Provided next is a cross support bar 66. The cross support bar has ends. The ends are attached to the ramp/platform adjacent to the side edges parallel with and rearwardly of the horizontal lower rail. The cross support bar is spaced above the ramp/platform. The ramp/platform is adapted to receive and support a hand truck. The hand truck is of the type having a vertical frame above and a horizontal nose below. The hand truck also has wheels. The hand truck has an electrical drive. The nose of the hand truck is positionable above the ramp/platform and beneath the cross support bar. The ramp/platform is adapted to be rotated to the angled lowered orientation. In this manner the hand truck may be rolled onto and off of the ramp/platform. The ramp/platform is adapted to be rotated to the horizontal raised orientation with the nose of the hand truck beneath the cross support bar and the frame of the hand truck between the intermediate rail and the locking bar.

Further provided are spring pins 70. The spring pins extend upwardly from the ramp/platform rearwardly of the cross bar. The spring pins are adapted to contact and retain the hand truck on the ramp/platform when in the horizontal raised orientation.

Provided last is a mounting bar 74. The mounting bar has a central section. The central section has ends attached to the vertical rails. A charging connector 76 is provided. The charging connector attached to the central section. The charging connector extends rearwardly. The charging connector is adapted to operatively contact and charge the electrical drive of the hand truck when on the ramp/platform in the horizontal raised orientation. The charging connector is further adapted to be separated from the electrical drive of the hand truck when in the angled lowered orientation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand truck ramp system for a hand truck comprising:
    a support rack having spaced vertical rails and horizontal upper, lower and intermediate rails, the horizontal rails being coupled to the vertical rails, a pivotable locking bar between the horizontal rails, side plates with rearward ends attached to the vertical rails adjacent to the lower rail, the side plates having forward ends forwardly of the vertical rails;
    a rectangular ramp/platform having a forward edge extending forwardly of the vertical rails and a rearward edge extending rearwardly of the vertical rails and having parallel side edges;
    hinges pivotally coupling the ramp/platform adjacent to its forward edge to the side plates adjacent to their forward edges for movement between raised and lowered orientations; and
    a cross support bar having ends attached to the ramp/platform adjacent to the side edges parallel with and rearwardly of the horizontal lower rail, the cross support bar being spaced above the ramp/platform.

2. The system as set forth in claim 1 wherein the ramp/platform is adapted to receive and support a hand truck of the type having a vertical frame above and a horizontal nose below, the nose of the hand truck being positionable above the ramp/platform and beneath the cross support bar, the ramp/platform adapted to be rotated from the lowered orientation for rolling the hand truck onto and off of the ramp/platform and the raised orientation with the nose of the hand truck beneath the cross support bar and the frame of the hand truck between the intermediate rail and the locking bar.

3. The system as set forth in claim 2 and further including;
    spring pins extending upwardly from the ramp/platform rearwardly of the cross bar, the spring pins adapted to contact and retain the hand truck on the ramp/platform when in the raised orientation.

4. The system as set forth in claim 2 wherein the hand truck is of the type having wheels and an electrical drive, the system further including;
    a mounting bar having ends attached to the vertical rails and having a central section, a charging connector attached to the central section and extending rearwardly, the charging connector adapted to operatively contact and charge the electrical drive of the hand truck when on the ramp/platform in the raised orientation and to be separated from the electrical drive of the hand truck when in the lowered orientation.

5. A hand truck ramp system (10) for facilitating the storage, and the removal from storage, of a hand truck with respect to a support rack mounted to the rear of a vehicle, the system comprising, in combination:
    a support rack (14) adapted to be mounted to the rear of a vehicle, the support rack having a rearward face (16) and a forward face (18), the support rack having two laterally spaced vertical rails (20) with vertically aligned apertures (22), a horizontal upper rail (24) and a horizontal lower rail (26) both fixedly coupled to the vertical rails, a horizontal intermediate rail (28) adjustably coupled to the vertical rails through the apertures, first and second horizontal rails (30), (32) adjustably coupled to the vertical rails through the apertures and extending rearwardly from the vertical rails, the first horizontal rail being formed with pivot holes (34), the second horizontal rail being formed with locking holes (36), a pivotable locking bar (38) having a pivot end with a pivot pin (40) coupled to the pivot holes, the pivotable locking bar having a locking end with a lock pin (42) couplable with the locking holes, a pair of side plates (44) with rearward ends (46) attached to the vertical rails adjacent to the horizontal lower rail, the side plates having forward ends (48) forwardly of the vertical rails;

a rectangular ramp/platform (52) having a forward edge (54) extending forwardly of the vertical rails and a rearward edge (56) extending rearwardly of the vertical rails and having parallel side edges (58), the vertical rails being located closer to the forward edge than the rearward edge;

hinges (62) pivotally coupling the ramp/platform adjacent to the forward edge (54) of the ramp to the side plates adjacent to the forward end for movement of the ramp/platform between a horizontal raised orientation and an angled lowered orientation;

a cross support bar (66) having ends attached to the ramp/platform adjacent to the side edges parallel with and rearwardly of the horizontal lower rail, the cross support bar being spaced above the ramp/platform, the ramp/platform adapted to receive and support a hand truck of the type having a vertical frame above and a horizontal nose below, the hand truck also having wheels and an electrical drive, the nose of the hand truck being positionable above the ramp/platform and beneath the cross support bar, the ramp/platform adapted to be rotated to the angled lowered orientation for rolling the hand truck onto and off of the ramp/platform, the ramp/platform adapted to be rotated to the horizontal raised orientation with the nose of the hand truck beneath the cross support bar and the frame of the hand truck between the intermediate rail and the locking bar;

spring pins (70) extending upwardly from the ramp/platform rearwardly of the cross bar, the spring pins adapted to contact and retain the hand truck on the ramp/platform when in the horizontal raised orientation; and a mounting bar (74) having a central section and having ends attached to the vertical rails, a charging connector (76) attached to the central section and extending rearwardly, the charging connector adapted to operatively contact and charge the electrical drive of the hand truck when on the ramp/platform in the horizontal raised orientation and to be separated from the electrical drive of the hand truck when in the angled lowered orientation.

\* \* \* \* \*